C. LE G. FORTESCUE.
ELECTRICAL PROTECTIVE DEVICE.
APPLICATION FILED SEPT. 21, 1915.
1,210,058.
Patented Dec. 26, 1916.
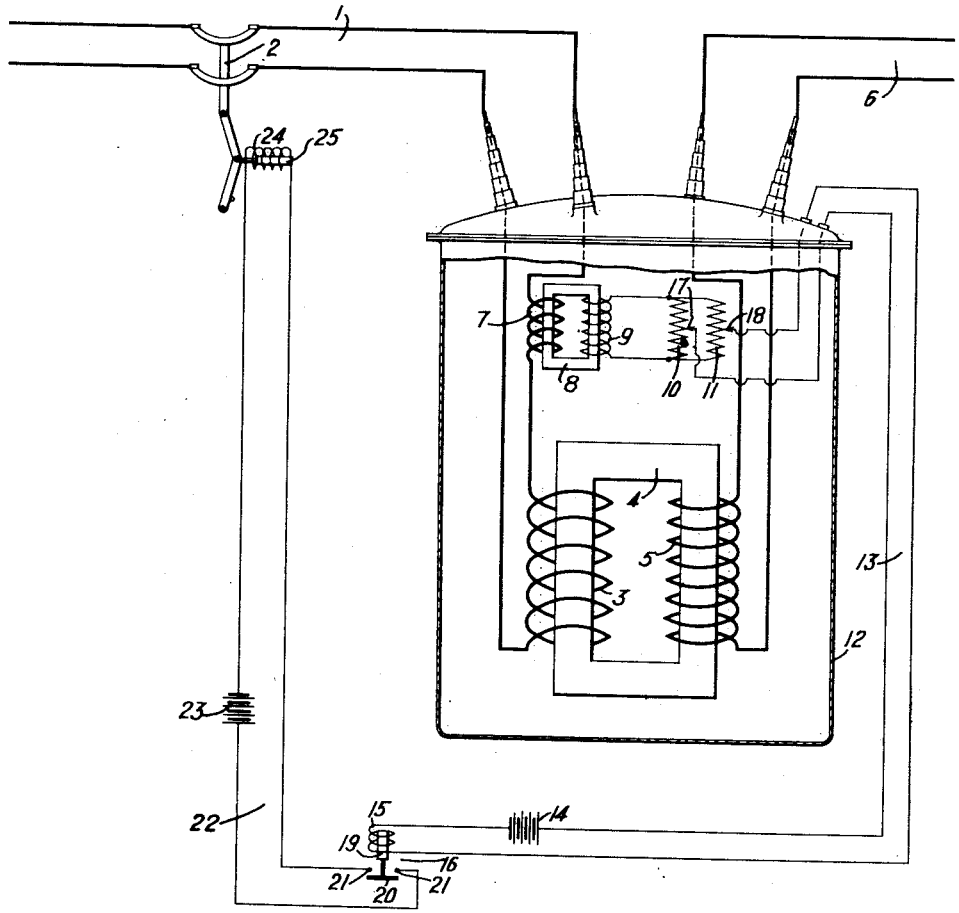
WITNESSES:
Fred. A. Lind.
J. A. Procter
INVENTOR
Charles LeG. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,210,058.  Specification of Letters Patent.  Patented Dec. 26, 1916.

Application filed September 21, 1915. Serial No. 51,867.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Electrical Protective Devices, of which the following is a specification.

My invention relates to electrical protective devices and particularly to means for protecting electrical translating devices in accordance with the temperatures thereof.

The object of my invention is to provide an electrical protective device that is actuated only when the temperature of the translating device to be protected reaches a predetermined value.

Heretofore, time-limit relays have been provided for the purpose of tripping circuit interrupters upon the occurrence of persistent overloads and for preventing the tripping of the same upon the occurrence of momentary overloads.

Inasmuch as some devices are capable of carrying material overloads without injury because of their superior ventilating, radiating and heat-dissipating properties, it is necessary to disconnect such devices from circuit only when their temperatures reach dangerous or destructive values. Under such conditions, I provide a resistor that is heated in accordance with the energy traversing the translating device, and I connect a constant-potential circuit, comprising a battery and an electro-responsive device, across equal-potential points of the resistor. Thus, when the resistance of the resistor changes, by reason of a change in temperature, the current that traverses the electro-responsive device will vary substantially in accordance with variations in the temperature of the resistor. If the resistor is so lagged that its heat emissivity, temperature gradient at currents corresponding to given loads and its heat capacity are the same as the translating device, the electro-responsive device may be actuated in accordance with the temperature of the translating device. The electro-responsive device may be utilized to control the operation of either a circuit interrupter, an oil pump or any other protective device.

The single figure of the accompanying drawing is a diagrammatic illustration of an electrical translating device that is protected by a relay embodying my invention.

An electrical circuit 1 is provided with a circuit interrupter 2, and has operatively connected thereto the primary winding 3 of a transformer 4, the secondary winding 5 of which is connected to an electrical circuit 6. The primary winding 7 of a current transformer 8 is connected in circuit with the primary winding 3 of the transformer 4, and the secondary winding 9 of the transformer 8 is connected in shunt relation to two non-inductive resistors 10 and 11 having negative temperature co-efficients. The transformer 8 and the resistors 10 and 11 are disposed in the transformer casing or tank 12. The resistors 10 and 11 are adapted to be sufficiently lagged to cause the temperature thereof to vary in accordance with the temperature of the transformer 4.

An auxiliary circuit 13 comprises a source 14 of constant-potential electromotive force and the winding 15 of an electro-responsive device 16. The conductors of the circuit 13 are connected to equal-potential points 17 and 18 of the resistors 10 and 11, respectively. The electro-responsive device 16 may consist of a contact making ammeter or voltmeter, but, for purposes of illustration, it is here shown as a simple plunger-type relay having a movable core member 19, a movable contact member 20 and stationary contact members 21. The stationary contact members 21 are connected to the conductors of a circuit 22 comprising a source of electromotive force 23 and the winding 24 of a tripping magnet 25 that is adapted to control the operation of the circuit interrupter 2.

When current traverses the primary winding 3 of the transformer 4, a substantially proportional current traverses the resistors 10 and 11, and, since the resistors 10 and 11 have negative temperature co-efficients, the resistance of the resistors 10 and 11 will decrease in accordance with the temperature of the transformer 4. Since the potential of the source 14 is constant, and, since the circuit 13 is connected across the equal-potential points 17 and 18, the current that traverses the winding 15 is proportional to the temperature of the transformer 4 and, when the temperature of the transformer 4 reaches a predetermined value, the movable core member 19 will be moved upwardly to effect engagement of the contact members 20 and 21 to thereby close the circuit of the winding 24 of the tripping magnet 25.

While I have specified the resistors 10 and 11 as having negative temperature co-efficients, it will be understood that resistors having positive temperature co-efficients may be used with equally good results. I wish it to be further understood that my invention is not limited to the protection of transformers nor to the tripping of circuit interrupters, as it may be utilized for various other purposes without departing from the spirit and scope of the invention as set forth in the appended claims.

I claim as my invention:

1. In a system of distribution, the combination with an electro-responsive device, of a resistor having a negative temperature co-efficient and adapted to be heated in accordance with the current that traverses the system, a source of constant potential connected to the said resistor and to the electro-responsive device for actuating the same when the resistor is of a predetermined temperature.

2. In a system of distribution, the combination with a translating device and an electro-responsive device, of a resistor having a negative temperature co-efficient and adapted to be heated in accordance with the temperature of the translating device, a source of constant potential connected to the said resistor and to the electro-responsive device for actuating the same when the resistor reaches a predetermined temperature.

3. In a system of distribution, the combination with a translating device and a protective device, of a resistor adapted to be heated in accordance with the temperature of the said translating device, a source of constant potential, an electro-responsive device connected in circuit with the source of constant potential, the circuit thus constituted being connected to the resistor and so proportioned as to actuate the protective device when the translating device reaches a predetermined temperature.

4. The combination with a translating device and a protective device therefor, of a resistor adapted to be maintained at a temperature proportional to the temperature of the translating device, a source of constant potential, and an electro-responsive device connected to the said resistor and adapted to actuate the protective device under predetermined conditions.

5. The combination with a translating device and a circuit interrupter therefor, of a resistor adapted to be maintained at a temperature corresponding to the temperature of the translating device, an electro-responsive device, and a source of electromotive force, said electro-responsive device being so connected to the resistor and a source of electromotive force that the current traversing the same is proportional to the temperature of the translating device.

6. The combination with a translating device and a circuit interrupter therefor, of a resistor adapted to be maintained at a temperature proportional to the temperature of the translating device, an electro-responsive device adapted to control the operation of the circuit interrupter, and a source of electromotive force connected in circuit with the electro-responsive device and the said resistor.

7. The combination with a translating device and a protective device therefor, of a resistor having a negative temperature co-efficient and adapted to be maintained at a temperature proportional to the temperature of the translating device, an electro-responsive device adapted to control the protective device, a source of constant potential connected in circuit with the said electro-responsive device, the circuit thus constituted being connected to points of equal potential on the said resistor.

8. The combination with a translating device, of a resistor adapted to be maintained at a temperature corresponding to the temperature of the translating device, an electro-responsive device, and a source of constant potential connected in circuit with the electro-responsive device, the circuit thus constituted being connected to points of equal potential on the said resistor.

9. In an electric circuit, the combination with a translating device, of a resistor operatively connected to the circuit and adapted to be maintained at a temperature corresponding to the temperature of the translating device, an electro-responsive device, and a source of constant potential connected in circuit with the electro-responsive device, the circuit thus constituted being connected to points of equal potential on the said resistor.

10. The combination with a translating device and a protective device therefor, of a resistor adapted to be maintained at a temperature proportional to the mean temperature of the translating device, and means adapted to be connected to equal-potential points on the resistor for actuating the protective device under predetermined conditions.

11. The combination with a translating device, of a resistor adapted to be maintained at a temperature proportional to the temperature of the translating device, and means connected to equal-potential points on the resistor and adapted to be actuated under predetermined conditions.

12. The combination with an electrical apparatus, of a resistor associated therewith and adapted to be heated in accordance with the heating characteristic of the said electrical apparatus, and an electro-responsive means operatively connected to equal-potential points on the said resistor.

13. In a system of distribution, the combination with a translating device and an electro-responsive device, of a resistor associated with the translating device and adapted to be heated in accordance with the heating of the translating device, a source of electromotive force connected to the said resistor and to the electro-responsive device for actuating the same when the resistor reaches a predetermined temperature.

14. In a system of distribution, the combination with a translating device and an electro-responsive device, of a resistor associated with the translating device and adapted to be heated in accordance with the heating of the translating device, a source of electromotive force connected to equal-potential points on the resistor and to the electro-responsive device.

15. The combination with a translating device, of parallel-connected means associated therewith and adapted to have the same heat emissivity, temperature gradient and heat capacity as the translating device, and means connected to equal-potential points on the parallel-connected means and adapted to be actuated under predetermined conditions.

16. The combination with two parallel-connected windings adapted to be heated in accordance with predetermined conditions, of means connected to equal-potential points on the said parallel-connected windings and adapted to be actuated under predetermined conditions.

17. The combination with a translating device, of two parallel-connected means adapted to be supplied with current in accordance with the current traversing the translating device, and means connected to equal-potential points on the parallel-connected means and adapted to be actuated when the temperature of the translating device reaches a predetermined value.

18. The combination with parallel-connected windings adapted to be heated in accordance with predetermined conditions, of a relay connected to equal-potential points on the windings and adapted to be actuated when the temperature of the windings reaches a predetermined value.

In testimony whereof I have hereunto subscribed my name this 10th day of Sept., 1915.

CHARLES LE G. FORTESCUE.